Patented Oct. 31, 1950

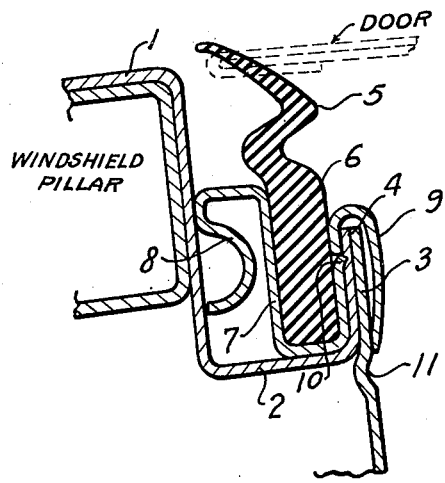
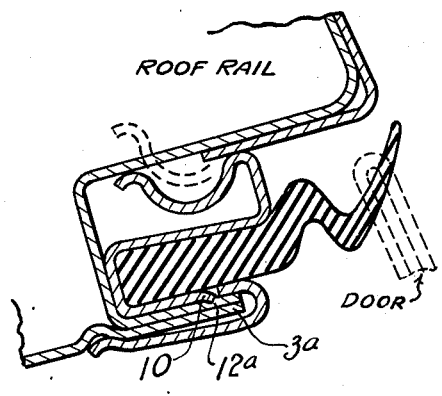
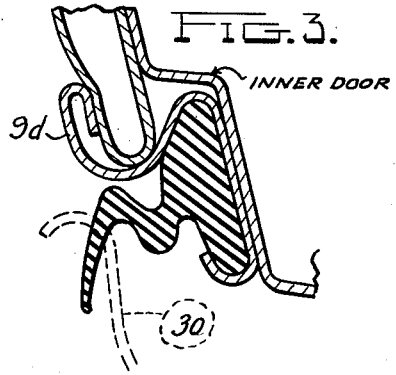
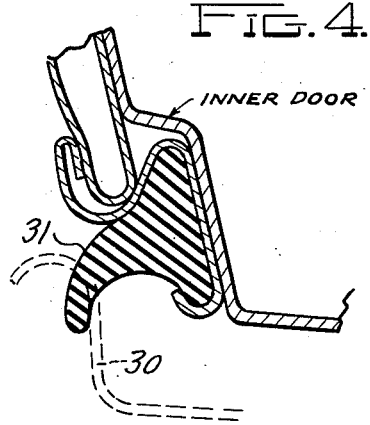
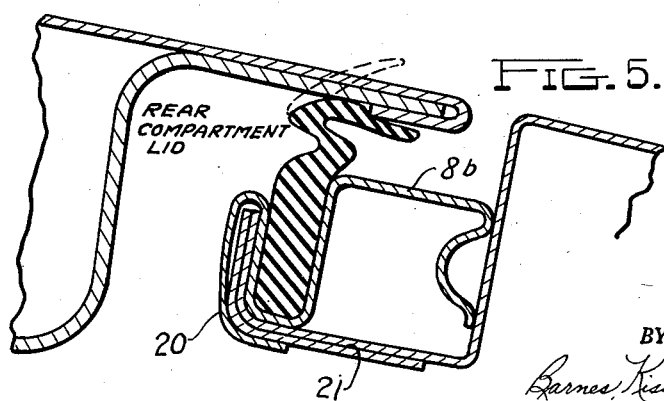

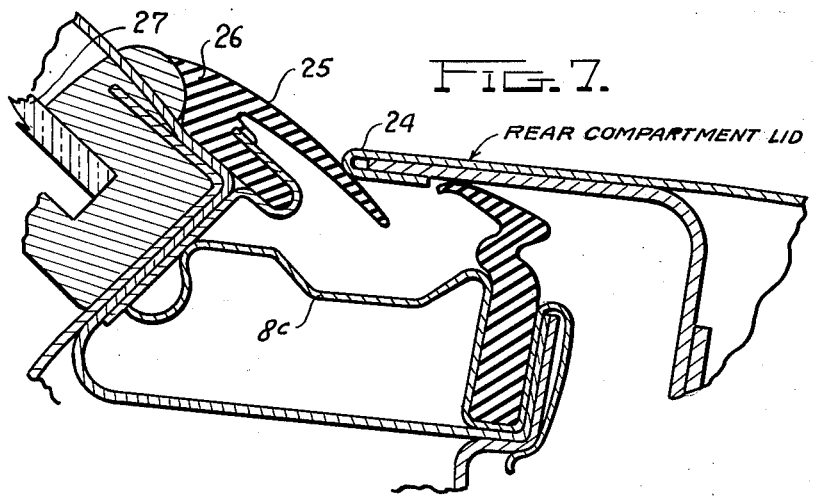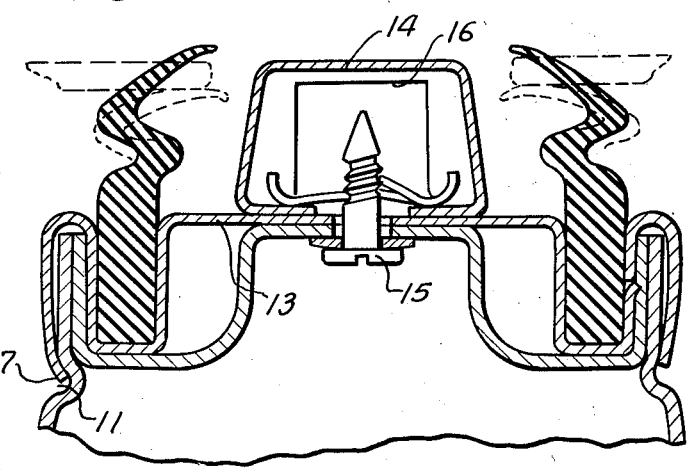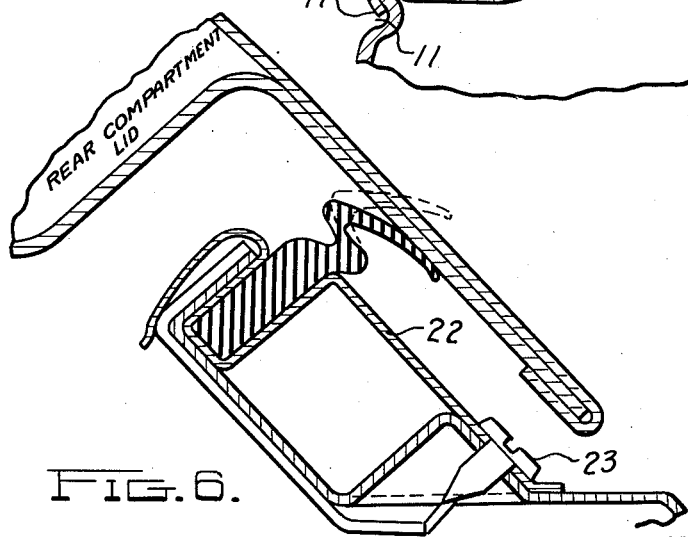

2,528,264

UNITED STATES PATENT OFFICE 2,528,264

WEATHERSTRIP

Kenneth E. Coppock, Pleasant Ridge, and Alfons A. Limberg, Grosse Pointe, Mich., assignors to General Motors Corporation, Detroit, Mich., a corporation of Delaware Application September 18, 1946, Serial No. 697,660

5 Claims. (Cl. 296—44)

1

This invention relates to weatherstripping for sealing automobile doors and windows.

It has been common practice to provide the door overlap flanges or the door frames with rubber sealing strips, usually sponge rubber strips. These have been cemented on or held in place by securing devices of one kind or another. These strips have not been altogether satisfactory as they often come loose or come completely off.

It is the object of the present invention to provide a rubber weatherstrip that is secured in a weatherstrip retainer which can be quickly and easily snapped in place and may be easily removed, if this is desirable. This weatherstrip can be used either on the door jamb or on the door itself. The idea is to provide a suitable projecting flange, usually a pinch weld flange, on the body around the door opening over which a spring U-frame of the weatherstrip retainer may be snapped. This will be more fully understood when the different workouts of the weatherstrip for different openings in the body are described in detail.

In the drawings:

Fig. 1 is a fragmentary section through the windshield pillar showing the application of my improved weatherstrip at this point.

Fig. 2 is a fragmentary section through the roof rail showing the application of the weatherstrip to the top of the door.

Figs. 3 and 4 are similar sections showing the application of the weatherstrip to the bottom of the door.

Fig. 5 is a section showing the application of the weatherstrip to the sides of the rear compartment opening.

Fig. 6 shows the strip as used at the bottom of the rear compartment opening.

Fig. 7 shows the strip as used at the top of the rear compartment opening.

Fig. 8 shows the strip applied to the center body pillar.

The windshield pillar is shown in Fig. 1. Here the outside body pillar cover 1 is formed with a channel 2 at the door opening and the inside pillar cover 3 laps the turned-up flange that forms the side wall of the channel. These lapped portions are welded together to form a pinch weld flange 4. A weatherstrip 5 has a gooseneck cross section or ? cross section, and the heavy body portion 6 is contained in a deep channel 7 which is of sufficient depth and springiness so that when the body of the weatherstrip is mounted therein it will be securely held

2 in place. One side of the channel strip has a spacing flange 8 and the other side of the channel has an inverted U-flange 9 which is adapted to snap over the pinch weld flange in the door opening. The strip is constructed of suitable non-corrosive, springy metal. At points in the side wall spring spurs 10 are struck out and these ratchet-like portions tend to bite into the metal of the pinch weld flange and prevent the strip from working off. The spacer flange on the inside of the channel strip is slightly contracted (see Fig. 2) when the spring metal retainer is crowded into the receiving channel of the body. The overlap U-flange straddles the pinch weld flange and tends to contract on that flange and hold it in place. A groove 11 can be provided in the pillar cover to receive the end of the spring flange and further lock the retainer in place.

The application of the weatherstrip to the roof rail is shown in Fig. 2. Here the pinch weld flange 3a is given a slight depression 12a to take the spur 10 in the spring retaining strip. Note also how much the spacing flange is put under contraction or stress when the weatherstrip is shoved home in the channel on the roof rail.

The application of the strip to the center pillar is shown in Fig. 8. This is quite similar to the other weatherstrips and retainers except here the spacing flange is done away with and the retainer is a double one. A central strip portion 13 fits over the face of the center pillar and is held in place by means of the decorative molding 14 which is secured to the center pillar by the screw 15 and the stamped sheet metal nut 16. Note that the turned-in edges 17 of the spring overlap flange snap into grooves 11 in the pillar cover.

In the layout of the strip for the rear compartment opening the strip for the sides of the opening is shown in Fig. 5. This is substantially the same strip as described in connection with the windshield pillar except that the spring overlap flange 20 extends around below the channel 21 formed in the rear body panel around the opening. The same type of spring spacing flange 8b is shown but it is somewhat wider than that used on the windshield pillars and the roof rail.

The weatherstrip and retainer used at the bottom of the rear compartment opening is shown in Fig. 6. Here the spring spacing flange is omitted and the flange 22 is secured to the body panel by means of a screw 23. At the top of the rear compartment lid (Fig. 7) a spacing flange 8c is used which is quite wide. Otherwise the weatherstrip retainer is substantially the same as in the other installations. The overlap flange 24 of the rear deck lid bears against the flexible wing 25 of weatherstrip 26 which is part of a seal for the back light 27.

At the bottom of the door quite a different retainer is used (see Figs. 3 and 4). No spacing flange is used and the opening in the snap-over flange is at right angles to the opening in the retaining channel of the strip. The snap-over flange is present, however, as 9d. The dotted-line showing, designated 30, is the threshold bead. The cross section of the rubber weatherstrip in Fig. 3 is a gooseneck or ? section and in Fig. 4 is merely a hook-like section 31.

We claim:

1. A weatherstrip for application to a metal automobile body member having an opening therein or to a closure member therefor, one of said members formed with a channel having an upstanding side wall thereon, said upstanding side wall being located at the margin of said opening or closure, said weatherstrip comprising a spring metal retaining strip having in the center a retaining channel and having at one side of the channel a spacing flange forming an inverted channel adapted to be contracted when the retaining strip is pushed into the first-mentioned channel and having at the other side of the retaining channel an overlap flange that is adapted to be expanded when the weatherstrip is slipped into the first-mentioned channel and this flange snapped over the upstanding side wall of such channel, and a rubber weatherstrip having a body crowded into the retaining channel of said metal retainer and having an exposed flexible wing for contacting the other of said members to be sealed.

2. A weatherstrip for application to a metal automobile body member having an opening therein or to a closure member therefor, one of said members formed with a channel having an upstanding side wall thereon, said upstanding side wall being located at the margin of said opening or closure, said weatherstrip comprising a spring metal retaining strip having in the center a retaining channel and having at one side of the channel a spacing flange adapted forming an inverted channel to be contracted when the retaining strip is pushed into the first-mentioned channel and having at the other side of the retaining channel an overlap flange that is adapted to be expanded when the weatherstrip is slipped into the first-mentioned channel and this flange snapped over the upstanding side wall of such channel, and a rubber weatherstrip having a body crowded into the retaining channel of said metal retainer and having an exposed flexible wing of gooseneck cross section for contacting the other of said members to be sealed.

3. A weatherstrip for application to a metal automobile body member having an opening therein or to a closure member therefor, one of said members formed with a channel having an upstanding side wall thereon, said upstanding side wall being located at the margin of said opening or closure, said weatherstrip comprising a spring metal retaining strip having in the center a retaining channel and having at one side of the channel a spacing flange grooved inwardly forming an inverted channel and adapted to be contracted when the retaining strip is pushed into the first-mentioned channel and having at the other side of the retaining channel an overlap flange that is adapted to be expanded when the weatherstrip is slipped into the first-mentioned channel and this flange snapped over the upstanding side wall of such channel, and a rubber weatherstrip having a body crowded into the retaining channel of said metal retainer and having an exposed flexible wing for contacting the other of said members to be sealed.

4. A weatherstrip for application to a metal automobile body member having an opening therein or to a closure member therefor, one of said members formed with a channel having an upstanding side wall thereon, said upstanding side wall being located at the margin of said opening or closure, said weatherstrip comprising a spring metal retaining strip having in the center a retaining channel and having at one side of the channel an overlap flange that is adapted to be expanded when the weatherstrip retaining channel is crowded into the first-mentioned channel and this flange snapped over the upstanding side wall of such channel, and a rubber weatherstrip having a body crowded into the retaining channel of said metal retainer and having an exposed flexible S cross-section wing for contacting the other of said members to be sealed.

5. A weatherstrip for application to a metal automobile body member having an opening therein or to a closure member therefor, one of said members formed with a channel having an upstanding side wall thereon, said upstanding side wall being located at the margin of said opening or closure, said weatherstrip comprising a spring metal retaining strip having in the center a retaining channel and having at one side of the channel an overlap flange provided with spurs or ratchet-like struck-out portions, said overlap flange adapted to be expanded when the weatherstrip retaining channel is crowded into the channel and this flange snapped over the upstanding side wall of the first-mentioned channel, and a rubber weatherstrip having a body crowded into the retaining channel of said metal retainer and having an exposed flexible S cross-section wing for contacting the other of said members to be sealed.

KENNETH E. COPPOCK.
ALFONS A. LIMBERG.

REFERENCES CITED

The following references are of record in the file of this patent:

UNITED STATES PATENTS

| Number | Name | Date |
|---|---|---|
| Re. 19,416 | McCormick | Jan. 8, 1935 |
| 1,738,350 | Buckhout | Dec. 3, 1929 |
| 1,991,674 | Hughes | Feb. 19, 1935 |